Patented May 13, 1952

2,596,662

UNITED STATES PATENT OFFICE 2,596,662

METHOD OF PREPARING AN EDIBLE PRODUCT

Louis F. Ducker, Orlando, Fla.; Joseph F. Burger, executor of said Louis F. Ducker, deceased, assignor of one-half to Petronella H. Dux, Jacksonville, Fla.

No Drawing. Application April 17, 1950, Serial No. 156,501

4 Claims. (Cl. 99—103)

This invention relates to a food product, constituting the rinds of citrus fruit, primarily as an ingredient in the production of candy, confectionery, bakery and other products and to the method of producing the same. The rinds preliminarily and independently treated for the removal and extraction of bitterness and undesirable flavor and rendering the same in a dehydrated powdered form to provide the body of a candy, confectionery and the like mixture and which possesses the characteristics of a stabilizer. A powdered dehydrated fruit rind, particularly orange, when admixed with a determined amount of a sugar syrup to give the same a desired density to be molded or worked into various shapes or forms of a solid or semi-solid consistency provides an admirable candy product and adaptable to be variously coated.

An object of the invention is to provide a dehydrated citrus fruit rind product, particularly oranges, free from bitterness and undesirable flavor, preferably pulverized and to a powdered degree of fineness, to provide an ingredient in the production of various food products for human consumption.

Another object is to provide a candy or confectionery product composed of a mixture of finely comminuted or powdered dehydrated citrus fruit rinds, free from any objectionable bitterness or flavor and a sugar syrup as a base for a candy, confectionery and the like mixture.

Another object is to provide a confectionery product and the like of an orange rind powder, free from bitterness and a sugar syrup adaptable to be mixed or homogeneously combined into a solid or semi-solid consistency at atmospheric temperature, to materially facilitate in the manufacture of a candy or confection, at a reduction in cost and to the elimination of corn starch and other ingredients commonly embodied in the production of candies considered as adulterants.

Other objects of the invention will be apparent from the following description:

In the use of orange peel or rinds as citrus cannery waste material for a palatable food product it is essential that the bitter tasting ingredients be removed from the rinds and that this be accomplished without the use of added chemicals in the treatment, primarily as a factor of cost reduction and avoid complications in the process of production of the rinds as an ingredient for a human food product.

Both of the flavedo which contains the coloring matter and also the albedo as a white spongy inner layer of the rind in their natural combined form or separately can be complementarily treated, as the albedo when a white or uncolored ingredient is desired for some types of candy or confectionery products or preparations.

The production of a dehydrated bitterless powdered orange rind as an ingredient for a candy or confectionery product to which the following description is specifically directed it is recognized as having other uses as for bakery products.

The rinds initially are comminuted to reduce the same to small particles of approximately one-eighth inch dimension and which can be accomplished by conventional apparatus. The particles in a batch quantity are placed in a suitable foraminous, gauze or screen container or carrier, equipped to be suitably readily suspended in a vessel in spaced relation therefrom into which water is contained or added in a quantity to completely cover and overlie the batch. The vessel for the normal contained water level heighth is provided with a water drainage outlet and at or slightly below the normal water level with a water inlet or inlets appropriately controlled and disposed from the outlet for a fluent and efficient drainage to evacuate and discard the liquified, extracted or released bitter flavor substances in the rind from the vessel and avoid being carried with the rind when the carrier is removed from the bath.

The vessel preferably beneath the base of the rind container or carrier is equipped with a steam inlet to jet or spray steam from beneath the batch of rind perpendicular therethrough, to temperature the bath between 230° F. to 250° F. and pressure the same to precipitate, neutralize, condense and release the bitter flavor substances and transmit the same from the rind for discarding drainage from the bath. The heated pressure influenced bath treatment is for a period from between six to twenty minutes, recognizing that as the orange rind of the same grade of fruit as from different localities or ripeness vary in degree of bitterness or bitter substances and also as time and temperature are corelated factors a reduction or increase in temperature relatively effects the time of treatment. The bath or cooking treatment of the rinds at a relatively high temperature more readily and admirably removes or neutralizes the bitter tasting substances and also provides an extremely economical procedure.

It is recognized that the rind may preliminarily be deoiled by passing the same through suitable apparatus, as for oil conservation, and which reduces the time that the rind is required to be subjected to the heated water bath treatment for removal of the bitterness, which can be accomplished in less than ten minutes and within a period of three minutes for the rinds of some grades or condition of oranges, although a systematic time control is more dependent and economical for large quantity production.

After the bitterness has been substantially removed from the rinds by the heated water bath treatment, the rind material is dewatered and dried or dehydrated at a temperature and rate to avoid scorching. The dehydration may be accomplished in any suitable manner and within conventional type of apparatus which need not be specifically described herein and which also applies to the reduction of the dehydrated rinds to a powdered consistency of a desired degree depending upon the desired use of the dehydrated bitterless rind product.

In the use of the dehydrated powdered rind as an ingredient for a candied or confectionery product it is essential that the rind be free of any bitterness or flavor so as not to modify or accentuate any specific flavor ingredient added to the mixture which the finished product is intended to possess.

To adapt the powdered rind to constitute the base or body of a confectionery product, for example, as a bar or of other contour configuration and density to be molded or worked into various shapes or forms as of solid consistency, the formula may comprise a thorough mixture of two ounces of the bitterless powdered rind and one pound of sugar syrup, either cane or corn syrup, which readily develops into a consistency at atmospheric temperature to be molded and shaped into various forms for the finished product or which additionally can be variously coated in a conventional manner with ingredients as commonly employed for such purpose.

The relative proportioning of the powdered rind and syrup can be variously modified, the syrup can also be mixed with the powdered rind in a heated state and effectively employed for making spreads, desserts and pastry products. The powdered rind being of a highly absorptive nature will take up or assume approximately three times its weight in moisture or liquid.

A mixture for a candy product of from one and one-half ounces of powdered rind and one pound of sugar syrup, with the ingredients at room temperature will be of a consistency to be molded and shaped and solidify within a period of twenty minutes, whereupon the forms can be individually wrapped and packaged, thereby effecting a material saving in time, as an industrial factor. As various other ingredients may be included for different varieties of candies or other products it may be more advantageous to preliminarily intermix all of some of the additional ingredients with the sugar syrup in a heated state before the powdered rind, which may also embody other ingredients, is included, and which may also alter the proportion of sugar syrup. The proportions of powdered rind and syrup given being for the production for a finished solid product or for the body of a product.

The syrup may be sugar in a fluid state, as subjected to heat or otherwise for its intermix with the powdered rind, and its percentage based on either crystalline or syrup form governed as to a body consistency required for different products, as soft, semi-solid or solid.

Having described my invention, I claim:

1. The method of preparing a substantially non-bitter and edible product from citrus fruit rinds which includes reducing the rinds to small particle size, subjecting the small rind particles submergingly sustained in a batch quantity within a heated water bath for a period of from six to twenty minutes, the bath induced to a temperature between 220° F. to 250° F., by a steam spray injected into the bath beneath the rind batch to agitate the rind particles and forcibly obliterate the bitter flavor substances from the rinds and flowingly removed from the bath by a current supply of water admitted into the bath and drained therefrom from above the rind batch, thence upon removal of the rinds from the bath, dehydrating and powdering the same and thereupon mixing the dry powdered bitterless rinds with a determined quantity of sugar syrup to densify the compound for molding into various shapes or for other service consistency.

2. The method of preparing a substantially non-bitter and edible product from citrus fruit rinds which includes reducing the rinds to small particle size, subjecting the small rind particles submergingly sustained in a batch quantity within a heated water bath for a period of from six to twenty minutes, the bath induced to a temperature between 220° F. to 250° F. by a steam spray injected into the bath beneath the rind batch to agitate the rind particles and forcibly obliterate the bitter flavor substances from the rinds and flowingly removed from the bath by a current supply of water admitted into the bath and drained therefrom from above the rind batch, thence upon removal of the rinds from the bath, dehydrating and powdering the same.

3. The method of preparing a substantially non-bitter flavor and edible product from citrus fruit rinds, consisting in reducing the rinds to a small particle size, subjecting the small rind particles in a batch quantity confined in a screen container submergingly in a heated water bath bearing a minimum temperature of 220° F., the temperature maintained and increased by steam injected into the bath beneath the batch and to agitate the rind particles to obliterate the soluble substances contained therein and with the admission of water into the bath flowingly remove the obliterated soluble matter and drain the same from the bath at an elevation above the batch during the treatment period that the batch is sustained within the bath.

4. The method of preparing a substantially non-bitter flavor and edible product from citrus fruit rinds, consisting in reducing the rinds to a small particle size, subjecting the small rind particles in a batch quantity confined in a screen container submergingly in a heated water bath bearing a minimum temperature of 220° F., the temperature maintained and increased by steam injected into the bath beneath the batch and to agitate the rind particles to obliterate the soluble substances contained therein and with the admission of water into the bath flowingly remove the obliterated soluble matter and drain the same from the bath at an elevation above the batch during the treatment period that the batch is sustained within the bath and upon removal of the treated batch from the bath dehydrating and comminuting the same.

LOUIS F. DUCKER.

REFERENCES CITED

The following references are of record in the file of this patent:

UNITED STATES PATENTS

| Number | Name | Date |
|---|---|---|
| 1,813,366 | Teusch | July 7, 1931 |
| 1,906,295 | Wickenden | May 2, 1933 |
| 2,485,279 | Giniewski | Oct. 18, 1949 |

OTHER REFERENCES

"Commercial Fruit and Vegetable Products," Cruess, third edition, McGraw-Hill Book Company, New York, 1948, pages 424 and 677.